June 1, 1948.　　　　D. E. LIPFERT　　　　2,442,421
CONTROL APPARATUS FOR INTERNAL-COMBUSTION ENGINES
Filed Sept. 4, 1946
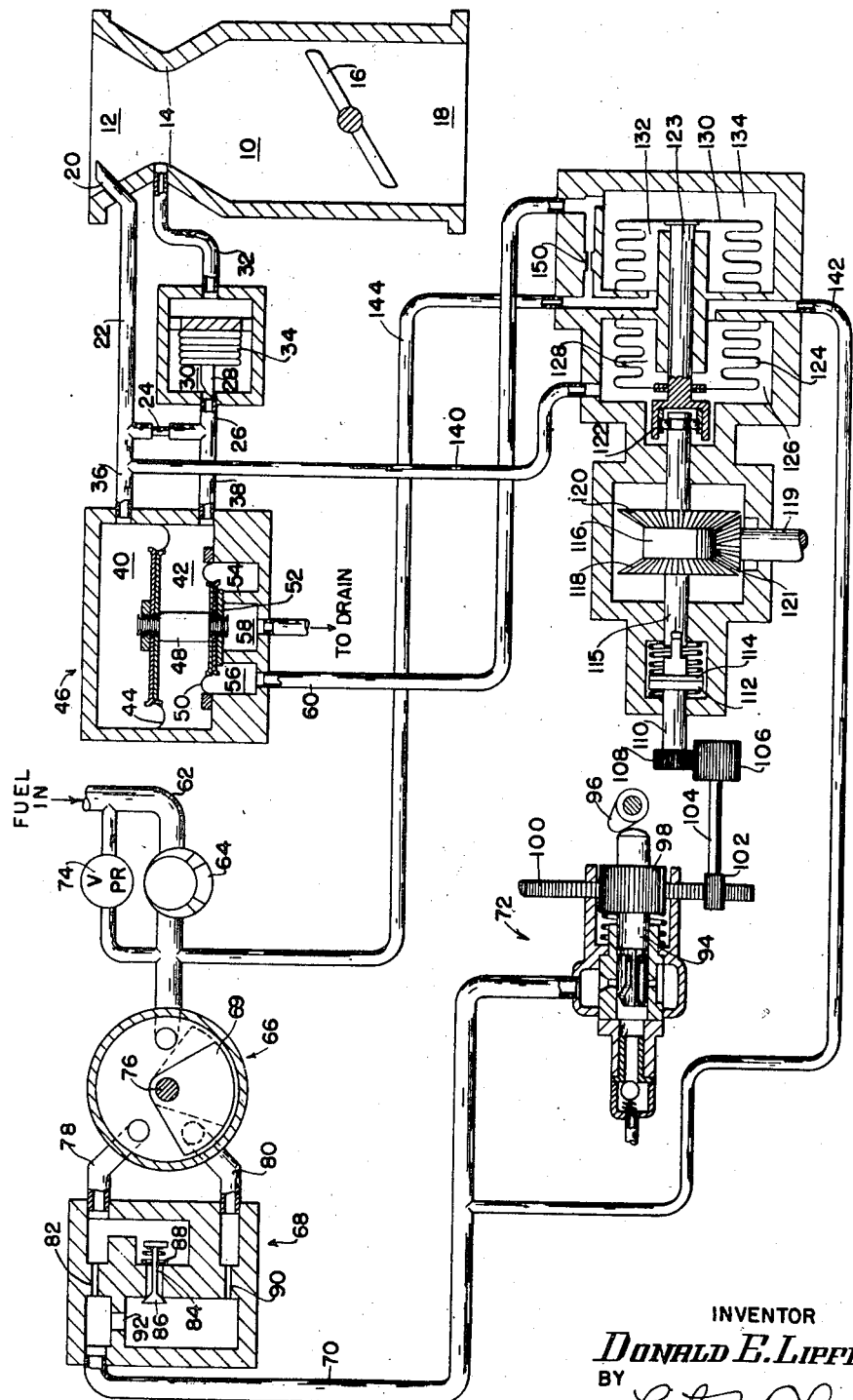
INVENTOR
*Donald E. Lipfert*
BY
*Lester W. Clark*
AGENT Patented June 1, 1948

2,442,421

UNITED STATES PATENT OFFICE 2,442,421

CONTROL APPARATUS FOR INTERNAL-COMBUSTION ENGINES

Donald E. Lipfert, Meriden, Conn., assignor, by mesne assignments, to Niles-Bement-Pond Company, West Hartford, Conn., a corporation of New Jersey Application September 4, 1946, Serial No. 694,695

5 Claims. (Cl. 123—119)

1

The present invention relates to control apparatus for internal combustion engines, and particularly to control apparatus for regulating the delivery of engine driven fuel injection pumps.

An object of this present invention is to provide means for positively positioning the delivery control mechanism of an injector pump in accordance with a variable controlling condition.

Another object is to provide means for positioning the delivery control mechanism of fuel injector pumps, wherein the power for positioning the delivery control is taken directly from the engine.

Other objects and advantages of my invention become apparent from a consideration of the appended specification, claims and drawing, in which The single figure represents, somewhat diagrammatically, a fuel supply system for an internal combustion engine embodying the principles of my invention.

Referring now to the drawing, there is shown an air conduit 10, thru which combustion air for an engine flows from an entrance 12, past a venturi 14 and a throttle 16, to a discharge outlet 18. The outlet 18 may deliver air either directly to the engine intake manifold or to the intake of the supercharger. In some cases, a supercharger may be provided anterior to the entrance 12.

The venturi 14 follows the well-known laws governing the characteristics of such devices. Therefore there is established between the entrance 12 and the throat of venturi 14 a differential of air pressures, which is a measure of the velocity of the air flowing thru conduit 10.

This difference of air pressures sets up a flow of air thru a secondary air passage which may be traced from an impact tube 20 opening into entrance 12, thru a conduit 22, a restriction 24, a conduit 26, past a valve 28 into a chamber 30, and thru a conduit 32 to the throat of venturi 14.

The valve 28 is positioned by a sealed flexible bellows 34, mounted in the chamber 30. The bellows 34 proper contains a fluid having an appreciable coefficient of thermal expansion, so that the position of valve 28 varies with both the pressure and temperature of the air in the chamber 30. By positioning the valve 28 in accordance with the pressure and temperature of the air, it may be made to regulate the pressure drop across restriction 24 substantially in accordance with the mass of air flowing thru air passage 10 per unit time. This manner of pressure and temperature compensation is more fully described in the patent to Milton E. Chandler, No. 2,393,144, dated January 15, 1946.

The pressure drop established across restriction 24 is communicated thru conduits 36 and 38 to chambers 40 and 42, respectively. The chambers 40 and 42 are separated by a flexible diaphragm 44 and are located in a pressure meter generally indicated as 46.

It may be seen that the force acting downwardly on the diaphragm 44 due to the difference in pressure in chambers 40 and 42 is a measure of the rate of flow of air to the engine. Attached to the center of diaphragm 44 is a valve stem 48, which extends thru another diaphragm 50 and carries a valve 52 on the opposite side of diaphragm 50. The valve 52 co-operates with an annular seat 54, and regulates the flow between an inlet chamber 56 outside the seat 54 and an outlet chamber 58 inside the seat 54. Fuel under pressure is supplied thru a conduit 60 to the inlet chamber 56, by means to be described later.

If the air pressure differential acting on diaphragm 44 increases, the valve 52 is moved downwardly until the flow into the outlet chamber is so restricted as to increase the pressure in inlet chamber 56 sufficiently to balance the increased downward force of the diaphragm 44. Similarly, if the air flow decreases, the force acting downwardly on diaphragm 44 is not sufficient to balance the fuel pressure acting upwardly on diaphragm 50 so that the valve 52 opens until its opening movement has relieved the pressure in inlet chamber 56 sufficiently so that the forces on the diaphragms are again balanced. It may therefore be seen that the pressure meter 46 operates to maintain a pressure in chamber 56 which is a measure of the rate of flow of air to the engine.

Fuel for the engine comes from a tank or other source (not shown) and flows thru a conduit 62, an engine driven pump 64, a mixture control unit 66, a jet system 68, and a conduit 70 to the injector pumps, one of which is illustrated at 72.

The pump 64 is provided with a pressure relief valve 74 which maintains its discharge pressure at a susbtantially constant value.

The mixture control unit 66 includes a disc valve 69 fixed on a shaft 76, which is manually rotatable by means not shown. When the disc valve 69 is in the full-line position shown in the drawing, fuel can flow from the mixture control unit to the jet system only thru a conduit 78. When the valve 69 is moved to the dotted line position shown in the drawing, then fuel can flow thru both the conduit 78 and another conduit 80 to the jet system 68. The full-line position of the valve 69 is known as the "lean" position of the mixture control, and the dotted line position is termed the "rich" position. The valve 68 may also be moved to a position wherein it cuts off all the flow of fuel to the jet system 68. This latter position is known as the "cut-off" position.

Fuel entering the jet system 68 thru conduit 78 passes thru a fixed restriction or jet 82, or a restriction 84 controlled by a valve 86, biased to a closed position by a spring 88. Fuel entering the jet system thru conduit 80 passes thru a fixed restriction 90. Fuel passing thru restrictions 84 and 90 also passes thru another fixed restriction 92.

The injector pump appearing at 72 is of conventional form, and includes a plunger 94 reciprocated by a cam 96, driven by the engine. The plunger carries a pinion 98, which mates with a rack 100. By reciprocating the rack 100 the plunger may be rotated on its axis. The plunger is provided with a helical groove co-operating with the inlet port thru which fuel is admitted to the cylinder ahead of the plunger. By rotation of the plunger, the point in the plunger travel at which the inlet port is closed and pumping begins may be varied. In this manner the quantity of fuel delivered per stroke of the plunger is controlled.

The rack 100 is positioned by a pinion gear 102 on a shaft 104. The shaft 104 is in turn driven by a gear 106 which mates with a gear 108 on a shaft 110. The shaft 110 carries a friction clutch member 112, which is spring-biased into engagement with another friction clutch member 114. The clutch member 114 is coupled by suitable mechanism with a shaft 115 which carries on a suitable frame 116 a pair of opposed spaced bevel gears 118 and 120. The right end of shaft 115, as it appears in the drawing, turns in a bearing 122 carried by a rod 123.

A bevel gear 121 lies between the opposed bevel gears 118 and 120 and is fixed on a shaft 119 driven by the engine. The gear 121 is normally spaced from both of the gears 118 and 120.

The rod 123 is attached to the free ends of a pair of opposed bellows 124 and 130. The bellows 124 separates a pair of expansible chambers 126 and 128. The bellows 130 separates a pair of expansible chambers 132 and 134.

The chamber 126 is connected thru a conduit 140 to the conduit 22 leading to the impact tube 20. The chamber 128 is connected thru a conduit 142 to the fuel conduit 70 on the downstream side of the jet system 68. The chamber 132 is connected thru conduit 144 to the fuel line on the upstream side of the jet system. The chamber 134 is connected to the conduit 60, wherein, as previously described, the pressure is maintained proportional to the rate of flow of air to the engine. The conduit 60 receives its supply of fuel from conduit 144 thru restriction 150.

The conduit 140 provides a vent for chamber 126. It may be seen that the pressure in chamber 134 acts to the left on the bellows 130 and therefore a force is applied to the left on rod 123 which is a measure of the rate of flow of air to the engine. At the same time the fuel pressure on the upstream side of the jet system is communicated to chamber 132, where it acts to the right on bellows 130. The fuel pressure downstream from the jet system is communicated to chamber 128 where it acts to the left on bellows 124. For a given area of a jet system open to the flow of fuel, the pressure drop across it is a measure of the rate of flow of fuel therethru. Hence it may be seen that the net force acting to the right on bearing 122 due to the difference in the pressure in chambers 132 and 128 is a measure of the rate of flow of fuel to the engine. Therefore the valve 122 is positioned in accordance with the balance of two forces, one proportional to the rate of flow of fuel to the engine and the other proportional to the rate of flow of air to the engine.

The pressure in chamber 126 is small as compared to the pressures in the other three chambers 128, 132 and 134. Furthermore, it is substantially constant, as compared to the variations in pressure in the other three chambers. In addition, any changes in that pressure act on rod 123 in the proper direction to correct the fuel flow for variations in the density of the entering air.

When the air and fuel flows are balanced, the frame 116 is positioned by the two bellows 130 and 124 as shown in the drawing, so that the shaft 115 is then not driven by shaft 119.

If the air flow increases, indicating a need of increased fuel flow if the same fuel-air ratio is to be maintained, then the increased pressure in chamber 134 moves rod 123 to the left, carrying bevel gear 120 into engagement with gear 121. This causes rotation of the shaft 115 in a direction to drive rack 100 in a fuel pump delivery increasing direction. The rack 100 continues to be driven in that direction until the fuel pressure differential acting on the bellows 130 and 124 has increased and moved the rod 123 to disengage the gears 120 and 121. At that time the air and fuel flows will again be balanced.

In a similar manner, as the air flow decreases, the rod 123 moves to the right, moving gear 118 to engagement with gear 121. The shaft 115 is then driven in the opposite direction, so as to move the rack 100 to reduce the pump delivery.

The bevel gears 118, 120 and 121 are shown by way of example only. These gears may be replaced by any equivalent pair of oppositely acting clutch mechanisms.

The friction clutch members 112 and 114 are provided to allow relative movement of the shafts 110 and 115 when the rack 100 has reached the end of its travel and the gears 118 or 120 remain engaged with gear 121.

It may, therefore, be seen that I have provided a mechanism for positioning an injector pump delivery control which is positive in its action, since it takes the power directly from the engine. Furthermore, it is rapid in its action, because the shaft 121 is continuously running.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim as my invention:

1. Control apparatus for an internal combustion engine, comprising injector pump means driven by said engine for delivering fuel to the cylinders of said engine, means for varying the delivery of said injector pump means, a power shaft driven by said engine, a control shaft connected to said delivery varying means for positioning the same, and reversing clutch means for connecting said power shaft to said control shaft so as to cause operation of said control shaft selectively in opposite directions, and means for operating said clutch means.

2. Control apparatus for an internal combustion engine, comprising injector pump means driven by said engine for delivering fuel thereto, means for varying the delivery of said injector pump means, a power shaft driven by said engine, a control shaft connected to said delivery varying means for positioning the same, a pair of selectively operable clutches for connecting said power shaft to said control shaft, one of said clutches being effective to cause operation of said control shaft in a direction opposite to the other, means for measuring the rate of flow of combustion air to said engine, means for measuring the rate of flow of fuel to said engine, means including both said measuring means for controlling the selective operation of said clutches, and a continuously engaged friction clutch associated with one of said shafts to permit continued rotation of said power shaft after said delivery varying means has reached the end of its travel.

3. Control apparatus for an internal combustion engine, comprising injector pump means driven by said engine for delivering fuel thereto, means for varying the delivery of said injector pump means, a power shaft driven by said engine, a control shaft connected to said delivery varying means for positioning the same, a pair of selectively operable clutches for connecting said power shaft to said control shaft, one of said clutches being effective to cause operation of said control shaft in a direction opposite to the other, means for controlling the selective operation of said clutches, and a continuously engaged friction clutch associated with one of said shafts to permit continued rotation of said power shaft after said delivery varying means has reached the end of its travel.

4. Control apparatus for an internal combustion engine, comprising injector pump means driven by said engine for delivering fuel thereto, means for varying the delivery of said injector pump means, a power shaft driven by said engine, a control shaft connected to said delivery varying means for positioning the same, a pair of selectively operable clutches for connecting said power shaft to said control shaft, one of said clutches being effective to cause operation of said control shaft in a direction opposite to the other, and means for controlling the selective operation of said clutches.

5. Control apparatus for an internal combustion engine, comprising injector pump means driven by said engine for delivering fuel thereto, means for varying the delivery of said injector pump means, a power shaft driven by said engine, a control shaft connected to said delivery varying means for positioning the same, a pair of selectively operable clutches for connecting said power shaft to said control shaft, one of said clutches being effective to cause operation of said control shaft in a direction opposite to the other, means for measuring the rate of flow of combustion air to said engine, and means including both said measuring means for controlling the selective operation of said clutches.

DONALD E. LIPFERT.